July 16, 1935. J. J. C. WILLEKENS 2,008,270
METHOD OF MANUFACTURING CARBON BLACK
Filed April 15, 1931 2 Sheets-Sheet 1

Inventor
Jacobus Joannes Cornelius Willekens
per [signature]
Attorney

July 16, 1935.  J. J. C. WILLEKENS  2,008,270
METHOD OF MANUFACTURING CARBON BLACK
Filed April 15, 1931   2 Sheets-Sheet 2

Inventor
Jacobus Joannes Cornelius Willekens
per
Attorney

UNITED STATES PATENT OFFICE 2,008,270

METHOD OF MANUFACTURING CARBON BLACK

Jacobus Joannes Cornelius Willekens, Brussels, Belgium, assignor to The General Carbonalpha Company, Wilmington, Del., a corporation of Delaware Application April 15, 1931, Serial No. 530,416
In France April 16, 1930

4 Claims. (Cl. 134—60)

It is known that carbon black may be obtained by the dissociation of carbon monoxide in the presence of a catalyst; for example, sesquioxide of iron ($Fe_2O_3$), at a temperature of about 425° C., the reaction being $2CO = CO_2 + C$.

The carbon black thus obtained is extremely fine and extremely light.

The present invention, which has for one of its objects to ensure a very intimate contact between the reaction gas and the catalyst, comprises a process for facilitating the catalytic decomposition of the carbon monoxide in which the current of carbon monoxide carries with it the catalyst supplied in the form of powder. This current becomes progressively richer in the product of the catalysis, that is to say, in carbon, the latter being held in suspension, by mechanical agitation, in the gaseous current which carries the products of the reaction towards the outlet of the reaction vessel.

The quantity of catalyst in powder form which is introduced is regulated in such a manner as to obtain at the outlet of the reaction apparatus a carbon product containing a definite percentage of residue from the catalyst as, for example, reduced iron, if an oxide of iron was the catalyst employed.

According to one form of the invention, the discharge of the reaction product is effected in two currents, namely, in a main current which is not directly subjected to the mechanical agitation, and in an optional secondary current accelerated directly by this mechanical agitation, the combination of these two currents ensuring regulation of the discharge of the reaction products.

According to another feature of the invention, the mechanical agitation which is effected within the apparatus is such as to ensure the suspension of the products of the reaction and of the catalyst in a powdery cloud, as indicated above, and also to retard the discharge of these products so as to maintain the amount of the products necessary for the continuity of the reaction.

Finally, thermal means may advantageously be provided for furnishing the necessary heat to initiate the reaction as well as to provide the requisite cooling effect for maintaining the exothermic reaction $2CO = CO_2 + C$ after its initiation.

The invention has also for its object to improve in general any process for the manufacture of carbon by the catalysis of carbon monoxide and in particular to improve the processes herein specifically referred to.

The invention has for its object in particular to accelerate the catalysis and to reduce its cost. A specific embodiment of the process of the invention is characterized by the gaseous current rich in carbon monoxide being placed in contact with a natural oxide of iron made from ferrous earth purified physically.

Experience shows that this catalyst, while very cheap, is very active.

The present invention also relates to a process of decomposing carbon monoxide in which a catalyst is employed containing in its particles in the state of inclusion a substantial proportion of ferrous compounds, such as iron oxide, this catalyst becoming enriched in carbon in the reaction of the decomposition of carbon monoxide and thus being changed into a catalyst containing proportionately less iron.

For example, it is possible to start with a carbon having 10% of iron and bring it to the state of carbon with 1% of iron. Regarded in this aspect the process of the present invention is one for reducing the content in iron of the product manufactured.

The process of the present invention may be practiced with the aid of any suitable apparatus. Two forms of a desirable construction are illustrated in the accompanying drawings, in which—

Figure 1:
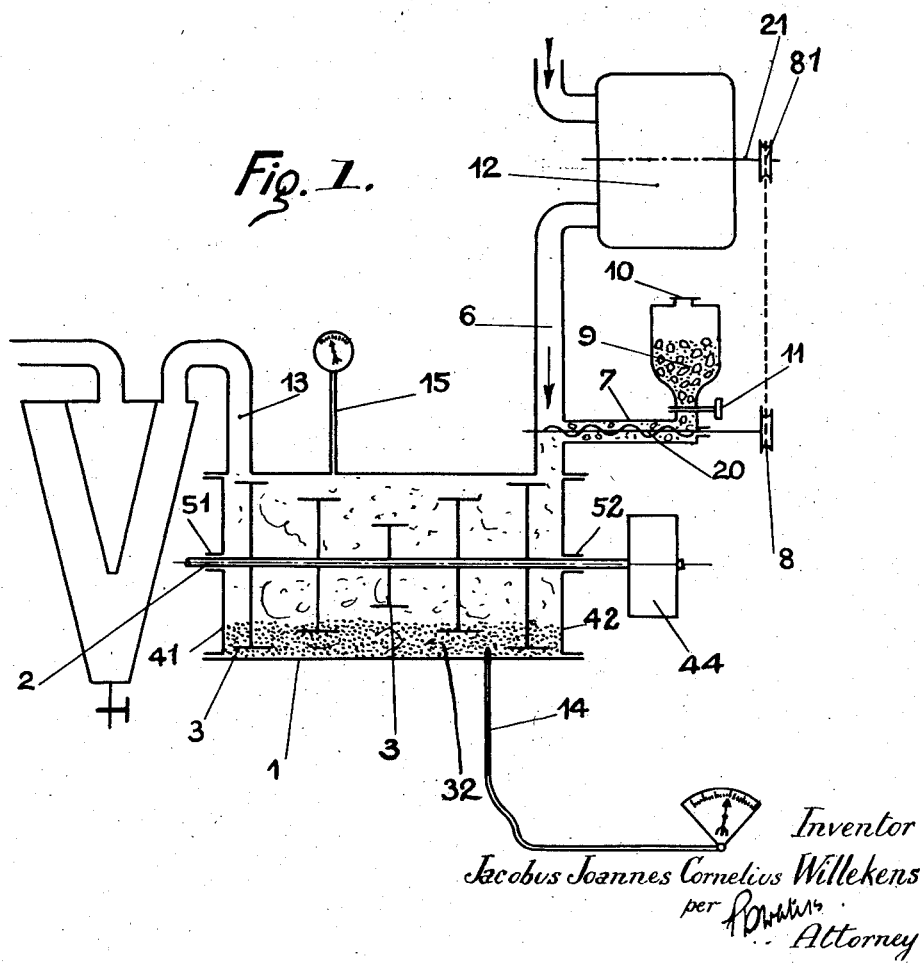
Fig. 1 is a longitudinal diagrammatic section of one form of apparatus.

The apparatus of Fig. 1 comprises a cylinder 1 capable of resisting a pressure, for example, of 375 pounds per square inch, and preferably made of refractory metal such as alloys of nickel.

A shaft 2, which may be hollow so as to be cooled by circulating water, carries radial paddles 3, or any other means for circulating the atmosphere inside of the cylinder, and in particular, of lifting the products deposited on the surface and putting them in suspension in the form of a cloud.

The shaft 2 controlled by the pulley 44 rotates at a slow speed and passes through the two cylinder heads 41 and 42 and stuffing boxes 51, 52 which may be cooled, for example, by circulating water.

The cylinder 1 is kept at the temperature of the reaction, approximately 425° C.

The gas containing the carbon monoxide is introduced into the cylinder 1 through a tube 6 into which discharges a pipe 7 intended to introduce the catalyst.

I may use, as catalysts, the metals of the iron group or the oxides, hydroxides or carbonates of such metals, upon which the active elements of substances may be deposited.

The catalyst is contained in a hopper 9 which is closed by a cover 10, and the bottom of which may be closed by a valve 11 to permit its being filled. An endless screw 20 is used to advance the catalyst through the pipe 7 into the tube 6. The pulley 8 of this endless screw is controlled by a wheel 81 mounted on the shaft 2.

The gaseous current reaches the interior of cylinder 1 through the tube 6 and carries the pulverulent carbon in the form of a dust cloud which results according to the reaction: $2CO = CO_2 + C$.

The gaseous current which issues from the apparatus through pipe 13 is a mixture of carbon dioxide produced by the reaction with undecomposed carbon monoxide, and this gaseous mixture carries the carbon black formed in suspension.

14 denotes a pyrometer which, through any appropriate well known means (not shown) controls the temperature in the cylinder 1 and may also control an automatic regulator (not shown) acting upon the heating or cooling apparatus.

A pressure gauge 15 indicates the pressure of the gas circulating in the apparatus.

The current of carbon monoxide admitted through the pipe 6 carries the catalyst supplied by the endless screw 20. This carbon monoxide and the catalyst which together enter the cylinder 1, are mixed intimately by the action of the rotating helicoidal paddles 3 arranged around the shaft L in such a manner that the dust cloud, formed by the carbon and the catalyst in suspension in the gaseous current, becomes progressively richer in carbon black up to the time of discharge from the apparatus through the pipe 13.

A part of the carbon black and any other form of carbon produced is deposited in the bottom of the cylinder and ensures the continuity of the cloud and the continuous support of the catalyst.

On the other hand, the quantity of catalyst with respect to the carbon monoxide, may be easily regulated by fixing the speed of the endless screw 20, by suitably proportioning the pulleys 8, 81.

There is thus discharged from the apparatus a carbon black with a definite maximum of impurities, that is to say, for example, of Fe, if $Fe_2O_3$ be used as the catalyst.

The pulley 8 of the endless screw 20 is driven from the pulley 81 mounted on the shaft 21 of a meter 12, for example, of the type having a central shaft, or of the liquid type, which measures the admission of the entering gas. In this manner automatic regulation between the gaseous input and the supply of catalyst is obtained.

Figure 2:
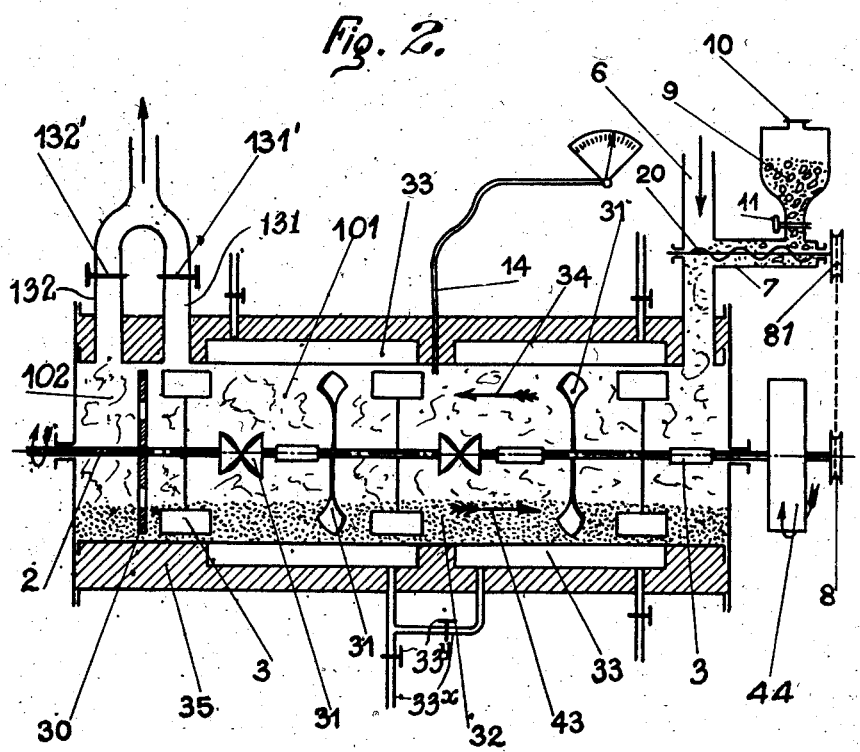
Figs. 2 and 3 are, respectively, a longitudinal and a cross-section of a modified form.
Figure 3:
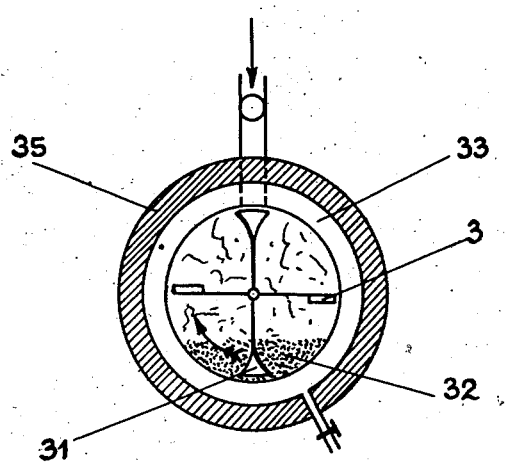

A variation of the invention is shown in Figs. 2 and 3 according to which the products of reaction escape through two outlet ports 131, 132, the outlet 131 leading from the chamber 101, and the outlet 132 from the chamber 102, the latter being separated from the chamber 101 by a partition 30 which may be perforated to facilitate the passage of the gaseous current. The chamber 102 is thus cut off from the projected particles thrown out by the paddles 3.

By manipulating the valves 131', 132', it is possible to regulate the discharge of the manufactured carbon black.

The principal outlet 132 is, in fact, regularly supplied from the chamber 102, the contents of which are quiescent and protected from the turbulence produced by the paddles. But if an excessive accumulation of carbon 32 takes place, it is sufficient to regulate the secondary outlet 131, thus allowing more carbon to escape in consequence of the position of this outlet with respect to the blades.

In a modified form of the invention, I provide in addition to the blades 3, a number of curved blades 31 (which are portions of helices) which have for their object to move the carbon 32 serving as a support for the catalyst in the direction of the arrow 43, that is to say, in a direction contrary to the gaseous current 34.

Each time the blades 31 dip into the mass 32, they impart thereto in consequence of their helical shape a slight displacement in the direction of 43.

Opposition is thus offered to the action of the current 34 which tends to carry the carbon black 32 towards the outlet, and to prematurely remove the catalyzing material which is deposited in the bottom of the cylinder and which serves as carrier of the reaction and thus retards the movement of the suspended solid products towards the outlets. For an apparatus of given dimensions, an equilibrium will be arrived at giving a regular and continuous reaction, by a suitable regulation of the gaseous supply and the speed of rotation of the shaft 2.

In the form of invention shown in Fig. 2, the apparatus is surrounded by one or more steam jackets 33 communicating with pipes $33^x$ controlled by valves $33^y$. To bring the apparatus to a temperature (approximately 425° C.) suitable for carrying out the reaction, superheated steam may be passed through pipes $33^x$ into the steam jackets 33, and to maintain this temperature during operation, steam, whether superheated or not, or water of the proper temperature may be supplied to the jackets 33 through the pipes $33^x$. The reaction $2CO = CO_2 + C$ is exothermic and if the apparatus is well heat insulated by an outer refractory lining 35 the recuperation of heat is possible.

I claim:

1. The herein described continuous method of manufacturing carbon black by catalytic decomposition of carbon monoxide in a reaction chamber, which method comprises continuously mixing outside of the reaction chamber measured quantities of carbon monoxide gas and quantities of solid pulverulent catalyst proportional to the quantities of gas thereby forming a suspension of said catalyst in the gas, continuously introducing a current of said mixed gas and catalyst into the reaction chamber, maintaining a reaction temperature within said chamber sufficient to produce carbon black, positively advancing said suspended mixture of catalyst, carbon black and gases in the reaction chamber from the admission end to the discharge end thereof, constantly maintaining the carbon black produced by catalysis in suspension in said suspended mixture during the advance of the latter thereby progressively enriching said suspended mixture in carbon black content, and discharging said suspended mixture with the products of reaction from said reaction chamber.

2. The method of claim 1, in which the carbon black content of said suspended mixture is regulated during the discharge.

3. The method of claim 1, including the additional step of retarding within the reaction chamber the solid suspended products while discharging the gaseous current from said chamber.

4. The method of claim 1, in which the carbon monoxide gas current is heated to initiate the exothermic reaction $2CO = CO_2 + C$ and a temperature of approximately 425° C. is maintained constant during the reaction.

JACOBUS JOANNES
        CORNELIUS WILLEKENS.